Figure 1:
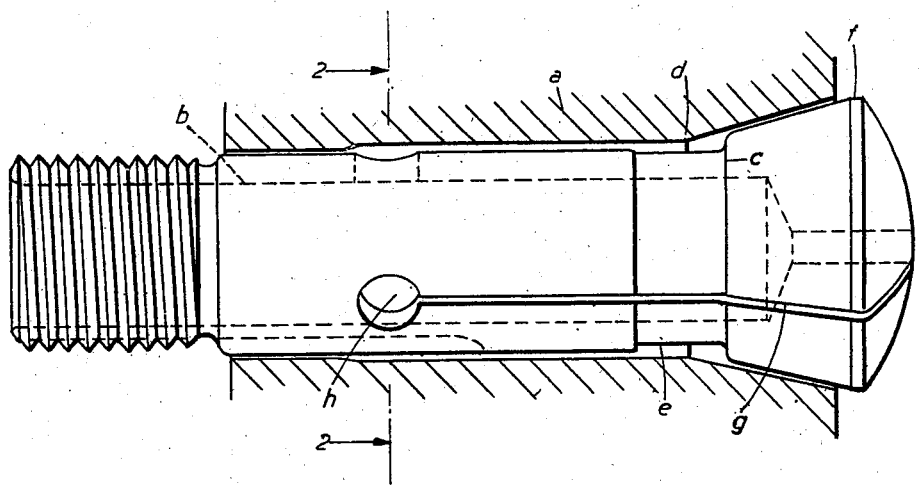

May 15, 1945.  F. M. SHAW  2,376,093
COLLET CHUCK
Filed Jan. 21, 1944

INVENTOR:
Fred Martin Shaw
By Attorney: Walter Gunn

Patented May 15, 1945

2,376,093

UNITED STATES PATENT OFFICE 2,376,093

COLLET CHUCK

Fred Martin Shaw, Salford, England

Application January 21, 1944, Serial No. 519,153
In Great Britain January 29, 1943

5 Claims. (Cl. 279—51)

This invention relates to the manufacture of collet chucks of the kind known generally as spring collets, such as are used, for example, in the smaller sizes, as the work-holders in instrument lathes and other small precision tools. These collets, as known, comprise a hollow cylindrical member split from one end to form contracting and expanding jaws, such jaw end having a conical formation on the exterior which brings about the desired contraction of the jaws as the collet is drawn or pushed into a co-operating conical socket.

Although loosely referred to as "spring collets" these articles hitherto have been made much too rigid, and their consequent lack of springiness and flexibility has given rise to many drawbacks in use. For example, as is explained more fully below, the collets have failed to grip the inserted material unless the diameter of such material and the diameter of the bore in the collet have coincided within very close limits, thus necessitating a large range of collets of different sizes. Again, and as is also explained below, extreme force has been required to close the collet on the work sufficiently tightly for a grip, even when the said diameters have coincided closely.

The present invention is based on an appreciation of the fact that in spring collets as previously known, the spring of the jaws is located mainly, if nor exclusively, by shaping at the root ends of the stems of the jaws, causing the jaws to move as if they were pivoted at such root ends. Obviously, therefore, except for the few occasions when the work diameter agrees exactly with that of the collet, the jaws will not engage the work throughout their effective length but either at their front or rear ends according to whether the work is small or large in diameter.

The extra force which is required to produce a secondary flexure of the stems to make such collets grip on their whole effective length is so great that if it can be executed at all by the operator this invariably leads to the premature destruction of the collet and often to the stripping of the draw bar or the nose cap, if not to more serious damage to the lathe or tool itself.

The object of the present invention is therefore to improve the gripping power of the jaws relative to the closing force applied thereto.

According to the invention the improved collet chuck of the kind referred to is characterised in that the stems of the collet jaws are each shaped at a point at or near the effective part of the jaw and away from the root end for secondary flexure for alignment of the jaws on the work.

The arrangement is such that, if and when the collet head meets the socket on a line only, further relative axial movement causes a two-fold deflection to take place in the stems of the jaws. There is a primary deflection which is a bending of the stems of the jaws located mainly if not exclusively at the root of the stems and there is a secondary deflection which is a slight bending of the collet stems at a point between the root and the jaw proper. These two deflections, which may be simultaneous or successive, not only cause the conical surfaces to assume a parallel relationship but to maintain that relationship despite the contraction of the head. It will be seen, therefore, that both the nature of the metal employed, and the form into which it is machined must lend themselves, to these two possible deflections without a permanent set, and without being such as to make the collet collapse under the axial and rotational stresses. An example of steel suitable for the invention is one which is free from distortion in hardening and which gives a maximum degree of surface hardness (including resistance to abrasion) combined with the greatest possible degree of toughness, such as for instance that known as Automobile Specification No. 5005/601 of the British Standards Institution Specification.

In carrying out the invention according to preferred embodiments, a steel having a high degree of flexibility and strength is selected, and the jaws of the collet are shaped by the usual rear bore of the collet being lengthened so as to extend well into the collet head, by the conical head being shortened at the rear; and by the external diameter of the collet shank being reduced to form an annular recess immediately adjacent the head. Also, at the foot of the slits which form the jaws, of which there may be two, three or four, the collet is pierced transversely, so as to increase the flexibility of the jaw stems. All external corners are rounded and, where possible, the lengthened bore from the rear of the collet is of a larger diameter than usual. Collets made according to these embodiments are characterised by a marked vibration when struck. In a modification, the external annular recess may be replaced by an internal annular recess, or the local weakening of the stem (to allow of the aforesaid secondary deflection) could be obtained by tapering one or both the inner and outer surfaces.

In the drawing herewith

Figure 2:
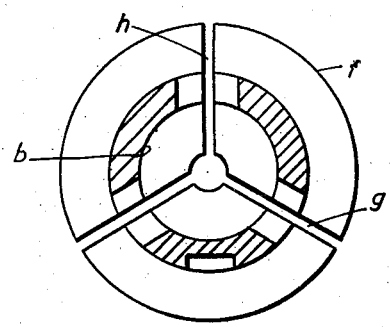

Fig. 1 is a longitudinal external view of one of the improved collets, with the adjacent parts of the socket being shown in section; and Fig. 2 is a cross section on line 2—2 of Fig. 1.

The drawing, which is approximately to scale for a collet measuring about 1¾ inches in length, shows the inner shape of the socket $a$ as consisting of a conical mouth, a parallel cylindrical bore of larger diameter, and a parallel continuation of the bore, of smaller diameter. The rear bore $b$ of the collet is of larger diameter and also is extended so that the internal conical end is beyond the rear shoulder $c$ of the head of the collet. Relative to the inner corner $d$ of the socket, the shoulder $c$ of the collet is machined and rounded over so as to shorten the head of the collet, whilst there is also a reduction of diameter in the shank of the collet, opposite such corner, forming an annular recess $e$ around the neck, to reduce the cross-sectional area of the metal at that part, and permit both the aforesaid primary flexure of the stems of the jaws from a locality near the conical head, and also the said secondary flexure at that locality. At its forward end, the head of the collet has the usual flat (cylindrical) portion $f$ which in this case is located beyond the end of the socket $a$. It is to be noted also that the end of the slits $g$ which divide the collet into its jaws, terminates at relatively large holes $h$ which, although shown as of circular form may be of elongated form, in line with the slits, or of other form.

In use, because of these features of construction, outlined above, and of the qualities of the selected metal, if, when the work-piece is inserted into the collet and the collet is drawn or pushed into its socket, the initial contact with the work obtains mainly, if not exclusively, from primary flexure at the roots of the jaw stems and if such contact with the work is at one end only of the jaws then contact between the two conical parts is at the other end only. Further relative axial movement of the collet in its socket brings about the aforesaid secondary deflection of the jaw stems, by flexure at the recess $e$ with the result that the cooperating conical surfaces of the collet and socket become parallel and continue to engage each other over the maximum area bringing the jaws over their full effective length into contact with the work. Moreover, by the selection of a steel having a high degree of flexibility and strength the jaws, although of a more slender form than usual, are sufficiently strong to resist collapse, and the root portion of the collet does not develop cracks as sometimes happens with the collets hitherto known.

It is also to be noted in the construction described and illustrated that the formation of the shoulder $c$ of the collet immediately against the annular recess is such that the smaller end of the conical part at such shoulder is of larger diameter than the base ring, and that the effect of extending the bore so that its inner conical end is beyond the shoulder $c$ results in the fact that the rear ends of the gripping parts of the jaws are forward of such shoulder.

What I claim is:

1. A collet chuck comprising a plurality of tapered jaws, each of said jaws at its smallest diameter being flexibly connected by a stem of part-tubular form to a common ring-like base, said stems being each of reduced cross-section at the zone adjacent to said jaws, the entire reduced portion being away from said base, said reduced portion having a lesser thickness of material than adjacent parts to assist secondary flexure at said zones for alinement of said jaws on a part to be gripped, the smallest diameter of said jaws being larger than the largest diameter of said stem.

2. A collet chuck comprising a plurality of tapered jaws, each of said jaws at its smallest diameter being flexibly connected by a stem of part-tubular form to a common ring-like base, said stems being each of reduced cross-section at the zone adjacent to said jaws, the entire reduced portion being away from said base and being a part-annular recess, said reduced portion having a lesser thickness of material than adjacent parts to assist secondary flexure at said zones for alinement of said jaws on a part to be gripped, the smallest diameter of said jaws being larger than the largest diameter of said stem.

3. A collet chuck comprising a plurality of tapered jaws, each of said jaws at its smallest diameter being flexibly connected by a stem of part-tubular form to a common ring-like base, said stems being each of reduced cross-section at the zone adjacent to said jaws externally of said stem, the entire reduced portion being way from said base, said reduced portion having a lesser thickness of material than adjacent parts to assist secondary flexure at said zones for alinement of said jaws on a part to be gripped, the smallest diameter of said jaws being larger than the largest diameter of said stem.

4. A collet chuck comprising a hollow cylindrical member split from one end to form flexible stems connected to a base ring, radially directed holes at and joining such splits at their base end to assist primary flexure for opening and closing of the split end, the split end being shaped to form a plurality of jaws having collectively a conical exterior for effecting contraction of the same onto a part to be gripped, the said conical exterior being tapered inwardly towards the said stems and shortened at its smaller end so that its smallest diameter is greater than the diameter of the said stems, said stems being of reduced cross-section at the zone adjacent to said smallest diameter of said jaws.

5. A collet chuck comprising a hollow cylindrical member split from one end to form flexible stems connected to a base ring, radially directed holes at and joining such splits at their base ends to assist primary flexure for opening and closing of the split end, the split end being shaped to form a plurality of jaws having collectively a conical exterior for effecting contraction of the same onto a part to be gripped, the said conical exterior being tapered inwardly towards the said stems and shortened at its smaller end so that its smallest diameter is greater than the diameter of the said stems, and the rear end of the gripping part of the jaws being located forwardly of the smaller end of the said conical part, said stems being of reduced cross-section at the zone adjacent to said smallest diameter of said jaws.

FRED MARTIN SHAW.